United States Patent
Thompson et al.

(10) Patent No.: US 8,531,924 B2
(45) Date of Patent: Sep. 10, 2013

(54) SYSTEM AND METHOD FOR A ROBOTIC STORAGE SYSTEM ORGANIZED BY HEAT VALUE OF STORAGE MEDIA

(75) Inventors: Nathan Christopher Thompson, Boulder, CO (US); Matthew Thomas Starr, Lafayette, CO (US); Robert Edward Weber, Longmont, CO (US)

(73) Assignee: Spectra Logic Corporation, Boulder, CO (US)

( * ) Notice: Subject to any disclaimer, the term of this patent is extended or adjusted under 35 U.S.C. 154(b) by 191 days.

(21) Appl. No.: 13/282,146

(22) Filed: Oct. 26, 2011

(65) Prior Publication Data

US 2013/0110287 A1    May 2, 2013

(51) Int. Cl.
*G11B 21/08* (2006.01)
(52) U.S. Cl.
USPC .................................. 369/34.01; 369/53.42
(58) Field of Classification Search
None
See application file for complete search history.

(56) References Cited

U.S. PATENT DOCUMENTS

| | | | | |
|---|---|---|---|---|
| 5,440,686 A | * | 8/1995 | Dahman et al. | 345/537 |
| 7,116,506 B1 | * | 10/2006 | Mojica | 360/71 |
| 7,924,663 B2 | * | 4/2011 | Grow et al. | 369/30.64 |
| 8,082,058 B2 | * | 12/2011 | Thompson et al. | 700/214 |
| 2010/0080097 A1 | * | 4/2010 | Nakamae | 369/47.15 |

* cited by examiner

*Primary Examiner* — Paul Huber
(74) *Attorney, Agent, or Firm* — Kenneth Altshuler

(57) ABSTRACT

Provided is a system and method for a organizing a robotic storage system. The robotic storage system includes a plurality of storage locations of varying priority and varying distance to a data read/write device. The robot storage system further includes a plurality of portable data storage elements each having at least three fields, a load field, a read/write field and a user determined field. A temporary storage location within the robotic storage system for each data storage element is determined at least in part by evaluating the data storage element's load field, read/write field and user determined fields to determine a heat value and correlating the heat value to the storage locations. An associated method of use is also disclosed.

27 Claims, 7 Drawing Sheets

FIG. 4

| DSE Number | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| UserScore | 0 | 25 | -25 | 0 | 25 | -25 | 0 | 25 | -25 | 0 | 25 | -25 | 0 | 25 | -25 |
| LoadCount | 1 | 1 | 1 | 1 | 1 | 1 | 1 | 1 | 1 | 50 | 50 | 05 | 200 | 200 | 200 |
| CapWritten/Load | 0.1 | 0.1 | 0.1 | 0.5 | 0.5 | 0.5 | 0.99 | 0.99 | 0.99 | 0.1 | 0.5 | 0.99 | 0.1 | 0.5 | 0.99 |
| LoadCountScore | -12.4345 | -12.434 | -12.434 | -12.43 | -12.43 | -12.43 | -12.43 | -12.434 | -12.43 | -0.15 | -0.1504 | -0.15 | 37.45 | 37.454 | 37.454 |
| CapWrittenScore | -22.8278 | -22.828 | -22.828 | -1.593 | -1.593 | -1.593 | 24.42 | 24.42 | 24.42 | -22.83 | -1.5926 | 24.42 | -22.8 | -1.593 | 24.42 |
|  |  |  |  |  |  |  |  |  |  |  |  |  |  |  |  |
| TotalScore | -35.263 | -10.262 | -60.262 | -14.03 | 10.973 | -39.03 | 11.989 | 36.989 | -13.01 | -22.98 | -1.7431 | 24.27 | 14.63 | 35.861 | 61.874 |
| Normalized Score | 25 | 50 | 0 | 46.24 | 71.235 | 21.235 | 72.248 | 97.248 | 47.25 | 37.28 | 58.5192 | 84.53 | 74.89 | 96.124 | 122.14 |
| After 1 Month | -30.2248 | -8.7692 | -51.653 | -12.02 | 9.4053 | -33.45 | 10.274 | 31.702 | -11.15 | -19.7 | -1.494 | 20.8 | 12.54 | 30.738 | 53.035 |
| Normalized Score | 21.4286 | 42.857 | 0 | 39.63 | 61.059 | 18.202 | 61.927 | 83.356 | 40.5 | 31.96 | 50.1593 | 72.46 | 64.19 | 82.392 | 104.69 |
| After 6 Monhts | -17.6311 | -5.1311 | 30.131 | -7.014 | 5.4864 | -19.51 | 5.993 | 18.493 | -6.507 | -11.49 | -0.8715 | 12.13 | 7.313 | 17.931 | 30.937 |
| Normalized Score | 12.5 | 25 | 0 | 23.12 | 35.618 | 10.618 | 36.124 | 48.624 | 23.62 | 18.64 | 29.2596 | 42.27 | 37.44 | 48.062 | 61.068 |
| After 2 Years | -7.05245 | -2.0525 | -12.052 | -2.805 | 2.1946 | -7.805 | 2.372 | 7.3972 | -2.603 | -4.596 | -0.3486 | 4.854 | 2.925 | 7.1723 | 12.375 |
| Normalized Score | 5 | 10 | 0 | 9.247 | 14.247 | 4.247 | 14.45 | 19.45 | 9.454 | 7.596 | 11.7038 | 16.91 | 14.98 | 19.225 | 24.427 |

|  | Sum | Average |
|---|---|---|
| LoadCount | 759 | 50.6 |
| CapWritten/Load | 7.95 | 0.53 |

SYSTEM AND METHOD FOR A ROBOTIC STORAGE SYSTEM ORGANIZED BY HEAT VALUE OF STORAGE MEDIA

CROSS-REFERENCE TO RELATED APPLICATIONS

None.

FIELD OF THE INVENTION

The present invention relates generally to systems and methods for data storage, and more specifically to systems and methods for organizing a robot storage system by a determined heat value of the storage media.

BACKGROUND

Data storage systems are a staple in digital mass storage for back-up and server applications. More specifically they are commonly used to archive data, i.e., stored data that is not immediately needed by a host computer. When a host computer needs the data, a request is sent out to the storage system to retrieve the data.

Within the storage system, data is typically archived on physical long term storage media, such as, tape, magnetic disk, optical disc, solid state memory, for example. When a request is received for data, the storage system identifies the physical long term storage media containing the specified data and a robot transport mechanism is dispatched to retrieve the long term storage media and provide it to a data transfer interface that is capable of establishing a communication path between the storage media and the requesting host computer.

One example of a storage system is a tape cartridge library. Other variations of storage systems utilizing disks, banks of memory chips or other long term storage media are also available.

In a tape cartridge system, as well as most other media storage system, there are typically a plurality of shelves structured to at least removably store a tape cartridge. In some instances, the tape cartridges or other media are themselves stored in movable packs that are themselves removably stored on shelf structures.

The storage system may have more than one drive (data transfer interface) for reading data from and writing data to the storage media. Further, the library may have more than one robot operating within the storage system to transport storage media between the storage shelves and the read/write drives.

As physical movement is an inherent characteristic of such systems, the time involved in responding to a host computer request can be a factor in overall storage system performance.

Shown in FIG. 1 are exemplary prior art storage systems 100 and 102. As illustrated, in many instances such storage systems have been designed such that the distance 104 between any given storage location 106 and the data transfer interface 108 is substantially equal. This is to say that the transport time of data storage media 110 from any given storage location 106 to the data transfer interface 108 is substantially the same. Such substantially equidistant, substantially equal time transfer storage systems are generally either substantially circular 112, or semi-circular 114.

Where multiple levels of storage are involved, either each layer is generally provided with its own data transfer interface 108 such that the transfer time for all locations 106 on all layers is about the same.

Though perhaps beneficial for equalizing transport time, such generally circular systems can be cumbersome to install, especially in pre-existing locations where square or rectangular systems would be preferred for economy of floor space.

It is to innovations related to this subject matter that the claimed invention is generally directed.

SUMMARY

Embodiments of this invention provide a system and method for data storage, and more specifically to systems and methods for storage system organization by heat value of the storage media.

In particular, and by way of example only, according to one embodiment of the present invention, provided is a method for organizing a robotic storage system, the method including: determining a heat value for each portable data storage element within the robotic storage system; and organizing the temporary storage of each portable data storage element within the robotic storage system based upon the determined heat value for each data storage element.

In another embodiment, provided is a robotic storage system, including: a plurality of storage locations of varying priority and varying distance to a data read/write device; a plurality of portable data storage elements each having at least a load field, a read/write field and a user determined field; and a temporary storage location for each portable data storage element determined at least in part by evaluating the load field, the read/write field and the user determined field of each of the portable data storage elements.

In yet another embodiment, provided is a method for organizing a robotic storage system, including: determining for each of a plurality of data storage elements a temperature value, each temperature value determined at least in part by evaluating for each data storage element at least a load field, a read/write field and a user determined field; and organizing temporary storage of each portable data storage element within a robotic storage system having a plurality of storage locations of varying priority and varying distance to a data read/write device, each storage location for a given data storage element determined by the temperature value of the given data storage element.

For yet another embodiment, provided is a robotic storage system, including: a portable data storage element having at least a load history, a read/write history, and a user determined priority; a data read/write device, structured and arranged to read the portable data storage element; a repository structured and arranged to store the portable data storage element at locations of varying priority, the repository further including: a portable container providing temporary storage to the storage element, the portable container having at least a first temporary storage position having a first priority and a second temporary storage position having a second priority the second priority less than the first priority; a plurality of shelves in varying proximity to the read write device, each shelf structured and arranged with a plurality of spots in varying proximity to the data read/write device structured and arranged to temporarily receive the portable data container, wherein the proximity of the shelf and the proximity of each spot upon the shelf determine varying priorities for temporary storage of the portable container; a robot structured and arranged to move the portable container between the data read/write device and a determined location; and a director structured and arranged to direct the robotic storage system for temporary storage of the portable storage element based on a heat value determined for the portable data storage element by evaluating the load history, the read/write history and the user determined priority.

Still further, in another embodiment, provided is a robotic storage system, including: means for determining for each of a plurality of data storage elements a heat value, a temperature level determined at least in part by evaluating for each data storage element at least a load field, a read/write field and a user determined field; and means for organizing temporary storage of each portable data storage element within a robotic storage system having a plurality of storage locations of varying priority and varying distance to a data read/write device, the temporary storage location for each given data storage element determined by the heat value of the data storage element.

BRIEF DESCRIPTION OF THE DRAWINGS

At least one system and method for a storage system response with migration of data will be described, by way of example in the detailed description below with particular reference to the accompanying drawings in which like numerals refer to like elements, and:

FIG. 4 is a table presenting associated field values for an exemplary set of data storage elements and their resulting heat values in accordance with certain embodiments of the present invention;

DETAILED DESCRIPTION

Before proceeding with the detailed description, it is to be appreciated that the present teaching is by way of example only, not by limitation. The concepts herein are not limited to use or application with a specific of system or method of data storage, or specifically the organization of a robotic data storage system. Thus, although the instrumentalities described herein are for the convenience of explanation shown and described with respect to exemplary embodiments, it will be understood and appreciated that the principles herein may be applied equally in other types of systems and methods for organizing a robotic storage system.

Figure 1:
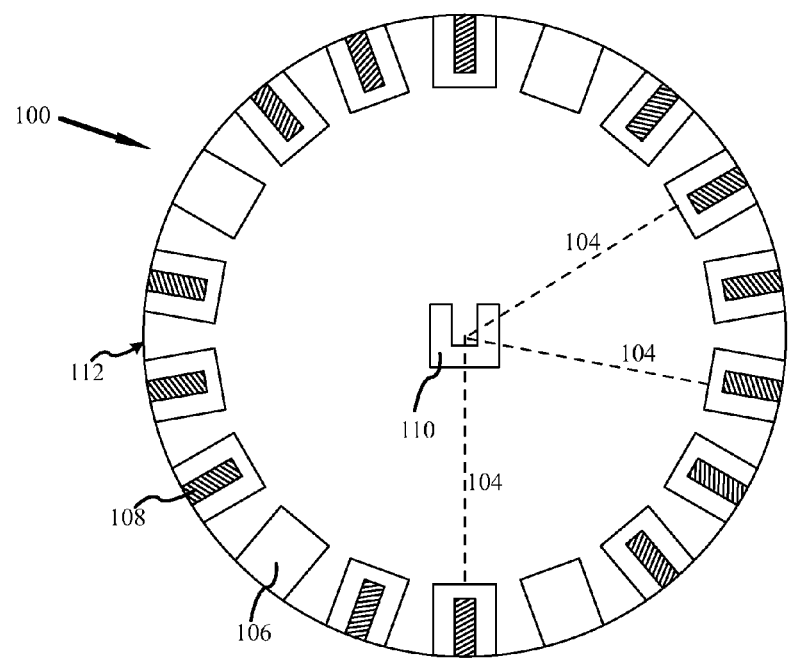
FIG. 1 illustrates a conceptual view of prior art storage systems having substantially equal distances between storage locations and the data transfer interface.
Figure 1:
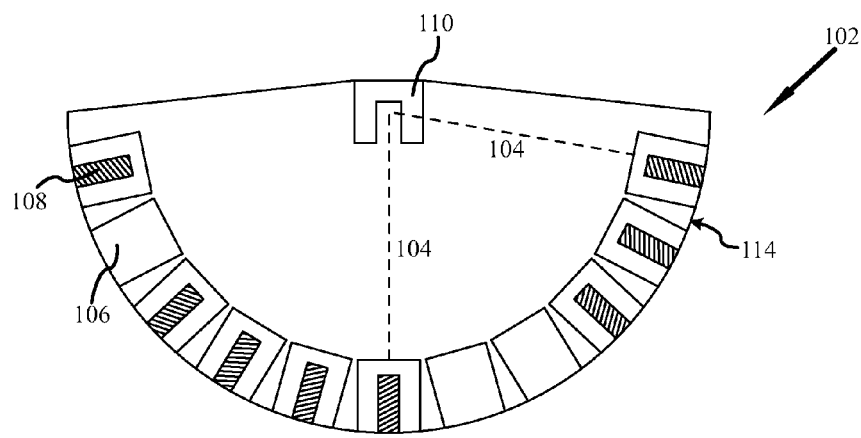
Figure 2:
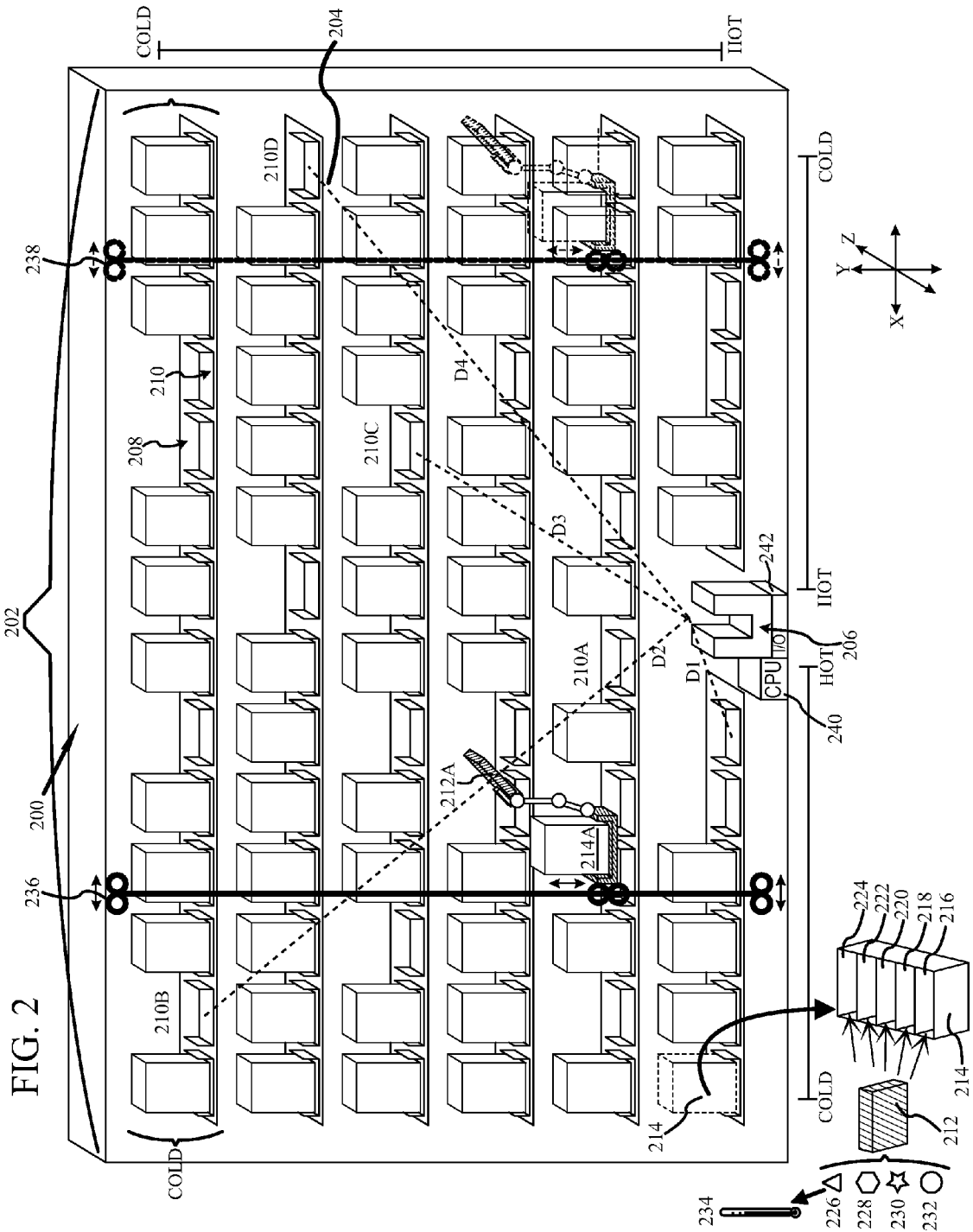
FIG. 2 is a conceptual view of a robotic storage system incorporating optimization of data storage elements based on determined heat value in accordance with certain embodiments of the present invention.

Turning now to the drawings, and more specifically FIG. 2, illustrated is a high-level diagram of a Robotic Storage System ("RSS") 200 in accordance with certain embodiments. As shown, the RSS 200 generally comprises a plurality of storage locations 202 of varying priority and varying distance 204 to a data read/write device 206. As shown in FIG. 2 the varying priory and varying distance 204 result in the storage locations effectively having varying temperatures—those closest to the read/write device 206 are described as Hot, whereas those more further away are described as Cold.

For at least one embodiment, the storage locations 202 are provided at least in part by a plurality of shelves 208 in varying proximity to the data read/write device 206. As shown, each shelf 208 has a plurality of spots 210 of varying proximity to the data read/write device 206. The proximity of the shelf 208 and the proximity of each spot 210 upon each shelf 208 determines varying priorities for each storage location 202 within the RSS 200.

The storage locations 202 may each receive a Data Storage Element ("DSE") 212. It is understood and appreciated that DSEs 212 may comprise, a tape, a tape cartridge, an optical disc, a magnetic encoded disc, a disk drive a memory stick, memory card, a solid state drive, or any other tangible data storage device suitable for archival storage of data within, such as but not limited to a tape, optical disc, hard disk drive, ram drive or other long term storage media.

To advantageously increase storage capacity, for certain embodiments the RSS 200 includes at least one portable container, of which portable container 214 is exemplary. It is understood and appreciated that portable containers 214 may comprise tape packs, tape drive packs, disk packs, disk drive packs, solid state drive packs or other structures suitable for temporarily storing subsets of the DSEs 212. For such embodiments, at least a subset of the spots 210 are structured and arranged to temporarily receive the portable containers 214.

As shown, portable container 214 has at least two storage positions, at least a first storage position 216 and a second storage position 218. Each storage position 216, 218 is structured and arranged to receive a DSE 212. In addition, each first storage position 216 has a first priority and each second storage position 218 has a second priority, the second priority being less than the first priority. More simply stated, due to mechanical operation in some embodiments, the end storage positions, e.g., storage positions 216 and 224 are less desirable then the inner storage positions, e.g., storage positions 218, 220 and 222.

Conceptually illustrated in FIG. 2, each DSE 212 has a load field 226, a read/write field 228, and a user determined field 230. In varying embodiments, each DSE 212 may also have a cooling field 232. Moreover, each DSE 212 has a load request history, a read/write per load history, and a time period since the DSE 212 was last used.

As is further described below, the load field 226 is determined from the load request history, the read/write field 228 is determined from the read/write history, and the cooling field 232 is determined from the time period since last use. The heat value 234 for each DSE is determined by evaluating combinations of the associated fields, e.g., the load field 226, the read/write field 228, the user determined field 230 and the cooling field 232. Organization of the DSEs 212 within RSS 200 is advantageously achieved by correlating the determined heat value 234 of each DSE 212 to the storage locations 202 based on location distance 204 and priority, e.g., the locations temperature.

It is also to be understood and appreciated that the heat value 234 of a DSE 212 is not necessarily synonymous with a priority value that may also be assigned to the DSE 212. Likewise, the temperature of a storage location 202 is not necessarily synonymous with a priority value that may be assigned to a storage position 218.

At least one robot, such as robot 236 is operable within the RSS 100 to move DSEs 212 between temporary storage locations 202 and the read/write device 206. Moreover, robot 236 is operable to select a portable container 214A and further select DSE 212A therein, and transport DSE 212A to the read/write device 206 in response to a request from a user.

It is understood and appreciated that read/write device 206, as used herein, is considered to be a device that forms a cooperating relationship with a DSE 212 such that data can be written to and received from the DSE 212 as the DSE 212 serves as a mass storage device. Moreover, in at least one embodiment a read/write device 206 as set forth herein is not merely a socket device and a cable, but a tape drive that is adapted to receive tape cartridges, a disk drive docking station which receives a disk drive adapted for mobility, a disk drive magazine docking station, a compact Disc (CD) drive used with a CD, a Digital Versatile Disc (DVD) drive for use with a DVD, a compact memory receiving socket, mobile solid state devices, etc. . . .

In addition, although the RSS 200 as shown in FIG. 2 has been illustrated with one data read/write device 206, this has been done for ease of illustration. In varying embodiments RSS 200 may have a plurality of read/write devices 206. In addition, as suggested by the illustration in dotted relief, RSS 200 may have at least a second robot 238.

As is appreciated in FIG. 2, Spot 210A is located a distance D1 from read/write device 206, Spot 210B is located a distance D2 from read/write device 206, Spot 210C is located a distance D3 from read/write device 206, and Spot 210D is located a distance D4 from read/write device 206. Further it is appreciated that D1 is closer then D2—moreover, the relative distances may be described with respect to each other as D1<D3<D4<D2.

The RSS 200 typically has a central processing unit ("CPU") 240 and associated components (including microprocessors, memory and the like) coupled to a receiver, such as input/output device ("I/O device") 242. I/O device 242 permits the RSS 200 to receive commands, such as read/write access requests from one or more host systems, not shown.

The CPU 240 is also operable to generate commands originating with the RSS 200, such as for example the performance of maintenance operations, the pre-staging of a robot 236 to a certain location within RSS 200, or other such operation that originates as a command from within RSS 200 as opposed to a command from a remote host. Moreover, the CPU 240 is operable as a director, structured and arranged to direct the RSS 200.

Moreover, RSS 200 may be summarized as a system having a plurality of storage locations 202 of varying priority and varying distance 204 to a data read/write device 206, such that the storage locations 202 have varying temperatures. The RSS 200 also has a plurality of portable DSEs 212, each having at least three fields, a load field 226, a read/write field 228 and a user determined field 230. The temporary storage location 202 for each DSE 212 is determined at least in part by a heat value 234 determined for each DSE 212. For at least one embodiment, the heat value 234 is determined by evaluating the DSE's 212 load field 226, read/write field 228 and user determined field 230. An associated cooling field 232 may also be evaluated.

Figure 3:
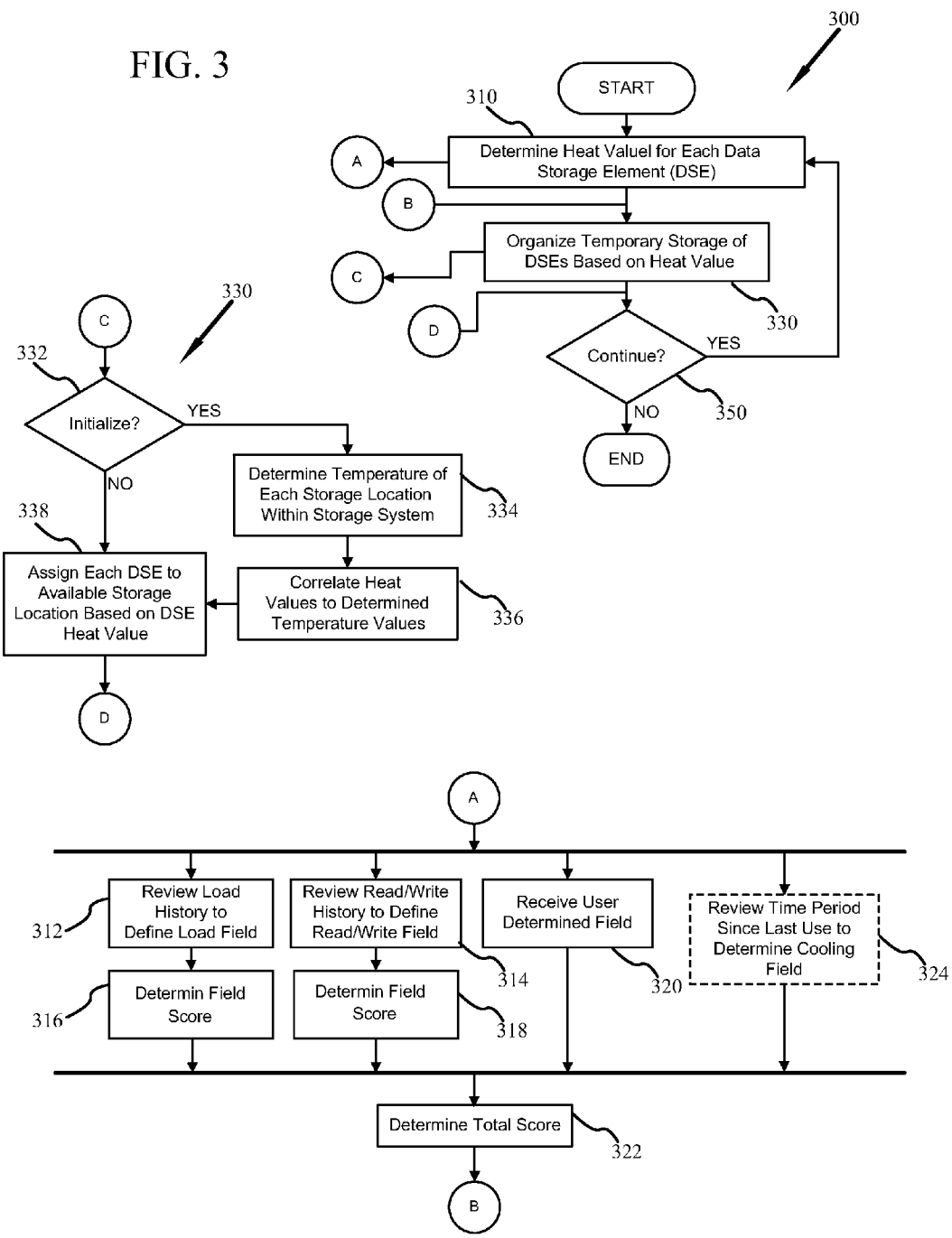
FIG. 3 is a high level flow diagram of a method for organizing a storage system based on heat value in accordance with certain embodiments of the present invention.

FIG. 3 conceptually illustrates a high level flow diagram depicting at least one method 300 for how RSS 200 advantageously optimizes storage based on the determined heat value 234 of each DSE 212. It will be understood and appreciated that the described method need not be performed in the order in which it is herein described, but that this description is merely exemplary of one method for organizing the RSS 200.

At a high level method 300 may be summarized and understood as follows. For the illustrated example, method 300 commences by determining the heat value 234 for each DSE 212, block 310. Within RSS 200, the temporary storage of the DSEs 212 is then organized based on the determined heat values 234, block 330. As the elements that dictate the heat values 234 are subject to change, the determination and organization processes may be ongoing, decision 350.

The process of determining heat values 234, block 310, is more fully appreciated as described with respect to the expanded flow diagram presented between references A and B, and table 400 presented in FIG. 4 (values have been cropped for space). Heat values 234 may be determined in a variety of different ways as may be preferred for different embodiments.

For the sake of example and as may be implemented for an embodiment, the component of the load field is determined at least in part by determining the average load history and the standard deviation of the load history for all data DSEs. Likewise the component of the read/write field is determined at least in part by determining the average read/write history and the standard deviation of the read/write history for all DSCs.

Standard deviation is a widely used measurement of variability or diversity commonly used in statistics and probability theory. More specifically, it shows how much variation there is from the average value. A low standard deviation indicates that the data points tend to be very close to the mean, whereas a high standard deviation indicates that the data points are spread out over a larger range of values.

Moreover, as shown in FIG. 4 for the sake of example there are taken to be fifteen DSEs 212 identified by numbers 1-15, 402. A UserScore 404 is also shown and corresponds to the user determined field 230. The UserScore is an indication of the users valuation of preference for each DSE. The LoadCount 406 represents the load history—specifically the number of times a given DSE has been loaded. The CapWritten/load 408 represents the read/write per load history.

Returning to FIG. 3, a review of the LoadCount (e.g., load history) is performed, block 312, so as to determine the LoadCount Sum and Average values shown in sub table 410. Similarly, a review of the CapWritten/Load (e.g., read/write history) is performed, block 314, so as to determine the CapWritten/Load Sum and Average values shown in sub table 410.

An adjustment value such as 20 is also selected. The adjustment value is a metric. For embodiments where the criteria of the load field 226 (e.g., the load history represented by LoadCount) and the read/write field 228 (e.g., the read/write history represented by CapWritten/Load) are to be sored equally, the absolute adjustment value selected is not important. However, in varying embodiments it may be desired to weight one criteria more heavily then the other. By selecting different adjustment values, a user is permitted to dynamically adjust how the scores are used in a particular environment. It should also be noted that the user may also change the selected adjustment value to adapt the scoring process for evolving changes that may occur in the specific environment.

A Score, i.e., a LoadCountScore 412 and a CapWritenScore 414 are then determined in accordance with the following formula for each DSE:

$$\text{Score} = \text{adjustment} \times \frac{\text{value} - \text{average(set)}}{\text{stddeviation(set)}}$$

For example, the average for the LoadCount is shown as 50.6. The Standard Deviation for the entire set of LoadCount is approximately 79.7781. Therefore, with the Adjustment value of 20 and a LoadCount of 1 for DSE Number 1, the equation is as follows:

$$LoadCountScore = -12.4345 = 20 \times \frac{1-50.6}{79.7781}$$

Similarly, the average for CapWritten/Load is shown as 0.53. The Standard Deviation for the entire set of CapWritten/Load is approximately 0.376734. Therefore, with the Adjustment value of 20 and a CapWritten/Load of 0.1 for DSE Number 1, the equation is as follows:

$$CapWriteScore = -22.8278 = 20 \times \frac{0.1-0.53}{0.376734}$$

This operation is repeated for each DSE 212 within RSS 200, as the values are shown in table 400. The UserScore, e.g., the user determined field 230 is also received, block 320. The total score is then determined by summing the LoadCountScore, the CapWrittenScore and the User Score, block 322 For the example of DSE Number 1 in table 400, this is 0+(−12.4345)+(−22.8278)=−35.263.

To facilitate correlation of the determined heat value of a DSC 212 to the temperature values of the storage locations 202, in at least one embodiment this total score is normalized. Normalization in general is the process of making elements conform to standard. With respect to databases and tables, normalization is the process of organizing data to minimize redundancy. For the present example normalization is accomplished by applying the equation:

NormalizedScore=Value−Min(Value_Set)

For DSE 1 this equation operates as:

NormalizedScore=25=−35.263−(60.26)

Moreover, for the present example DSE 1 has a determined heat value 234 of 25, whereas DSE 8 has a determined heat value 234 of 97.248 and DSE 16 has a determined heat value 234 of 122.14.

As noted above, in certain embodiments the determined heat value 234 for a DSE 212 may also be affected by a cooling field, i.e., the amount of time that has passed since the DSC was last requested. For the example as illustrated, this cooling factor is determined by the following equation wherein N is the time for 50% reduction (for example 6 months) and T=the time since the last load request.

$$Score = OldScore \times \frac{T \times N}{T \times (T+N)}$$

Table 400, shows the application of the cooling field for 1 month 6 months and after 2 years, cooled values 416. For example, if after two years DSE 15 has not been loaded, its determined heat value 234 will drop from 122.14 to 24.427.

The process of organizing by heat value 234, block 330, is more fully appreciated as described with respect to the expanded flow diagram presented between references C and D. More specifically, the process of organizing may commence with a determination of whether RSS 100 is being initialized, decision 332.

In response to a YES, the method proceeds to determine the temperature of each storage location 202 within RSS 200, block 334. The determination of temperature is based at least in part on varying combinations of at least three factors:

A) physical distance of the storage location 202 from the read/write device 206;

B) physical location of the storage location 202 within RSS 200;

C) varying priority of storage positions, e.g., 216, 218, 220, 220, which may be provided at each storage location 202.

Moreover, as shown in FIG. 2 the distance D2 for Spot 210B is greater then the distance D3 for Spot 210C indicating that the transport time between the read/write device 206 and Spot 210B will, in general, be greater than the transport time between the read/write device 206 and Spot 210C. In addition, some physical locations, such as the top shelf 208A, may have limitations, such as for example tighter tolerances that require the robot 236 to move more slowly, and therefore reduce the preference of generally all storage locations on the top shelf 208A.

With the priorities of the storage locations 202 determined, method 300 moves to correlating the heat values 234 to the determined temperature values of the storage locations 202, block 336. Moreover, the heat values 234 span a range which is correlated to the priorities of each storage location 202. A storage location 202 for a DSE 212 having a specific heat value can then be determined. Each DSE 212 is then assigned to an available storage location 202 based on the DSE 212 heat value 234, block 338. For at least one embodiment, this assignment is achieved with a bubble sort routine.

With respect to the above example from table 400, the heat value 234 of DSE 15 has been determined as 122.14, the highest heat value 234 for all fifteen DSEs. The heat value 234 of DSE 3 has been determined as 0, the lowest value for all fifteen DSEs. Accordingly, the heat value scale for the DSEs is correlated to the temperature scale for the storage locations 202. Where RSS 200 is symmetrical, in general there will be two storage locations 202 of generally equal temperature. Where more than two DSEs have about equal heat values, the additional DSEs may be adjusted up or down in storage location temperature depending on availability.

Implementation of the determined organization scheme may be achieved in at least three ways—i) immediately, ii) at a future time, and iii) an ad-hoc as resources permit fashion. Of course RSS 200 may actually operate and implement optimization based on the determined heat values 234 with all three of these options at different times in response to changing assessments for when and how such optimization should be performed.

For the first way (immediate implementation), the determination of heat value 234 and the organization are performed essentially contemporaneously. Although improved implementation is advantageous, the RSS 200 is likely in use and the robot 236 is responsible for providing requested DSEs 212 to and from the read/write device 206 as well as relocating the DSEs 212 within RSS 200. As such, when service load requests are high, contemporaneous operation may in some cases introduce some additional latency.

For the second way (future implementation), the determination of heat values 234 is an ongoing process which continues generally up until the optimization is to be performed. At a set time, or perhaps in response to a command from an operator, RSS 200 is effectively taken off line such that implementation of optimization on the basis of the determined heat values 234 is performed without interruption or ongoing change to the determined heat values 234. Although maximizing the speed of the optimization process, for some implementations of RSS 200 it may be undesirable to take RSS off-line simply for the purposes of optimization.

For the third way (ad-hoc implementation), the determination of heat values 234 is again an ongoing process. Actual implementation of the optimization process is performed on an ad-hoc basis, which is to say, optimization based on heat value 234 is performed with system resources permit, e.g., no requests are occurring or the requests are below a user defined level of priority, and delayed when system resources do not until such time as the system resources once again permit.

With respect to the above description of determining heat values 234 and implementing organization based thereon, it is understood and appreciated that in varying embodiments a lower priority DSE 212 may well have a higher heat value 234 based on greater frequency of use. Indeed, in varying embodiments, statistical prediction of which DSE 212 will likely be requested after a current DSE 212 may also be a contributing factor in deterring heat value. Such a method is disclosed in US patent application entitled SYSTEM AND METHOD FOR DIRECTING A ROBOTIC STORAGE SYSTEM, application Ser. No. 13/008,701 incorporated herein by reference.

Figure 5:
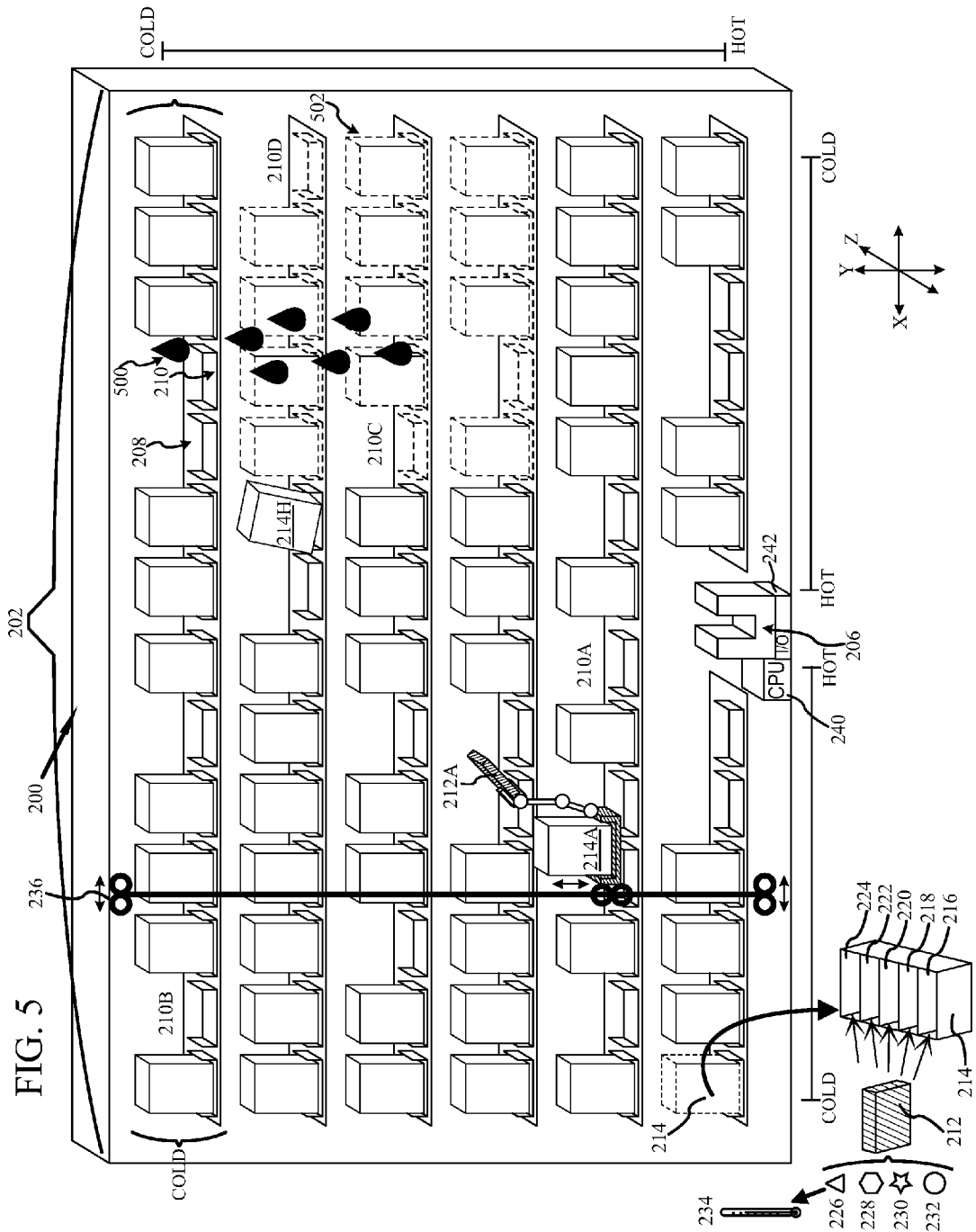
FIG. 5 is another conceptual view of robotic storage system incorporating optimization of data storage elements based on determined heat value in accordance with certain embodiments of the present invention.

With respect to the above description, and specifically the determination of temperature for each storage location 202, it will be understood and appreciated that RSS 200 is advantageously adaptable for changes that may occur within RSS 200, as illustrated in certain embodiments consistent with FIG. 5. For example, a portable container 21411 may become difficult to handle. Likewise an adverse environmental condition 500 may occur—such as, but not limited to, water damage, earthquake shifting, or the like, which may render a portion 502 (shown in dotted relief) of RSS 200 difficult to access for some period of time. Though not shown, maintenance may be desired upon a portion of RSS without taking RSS 200 entirely off line, and/or a mechanical fault in robot 236 may make travel to certain locations within RSS 200 difficult. By adjusting the priority values of the storage locations 202, the overall temperature values of storage locations 202 can easily and adaptively be adjusted in essentially real time to permit reorganization of RSS 200 based on the heat values 234 of the DSEs with accommodation to whatever event has befallen RSS 200.

In at least one embodiment, the user determined field 230 may also be set to establish a condition of Absolute Cold. Such a designation may be applied to DSEs 212 for which a user of RSS has agreed to pay a minimum storage fee with the understanding of potentially greater latency in response then with respect to other DSEs 212. Of course the Absolute Cold designation is not limited to conditions based strictly on fees—an example selected for ease of discussion—but may certainly be applied for whatever circumstances are desired by the operator of RSS 100.

Figure 6:
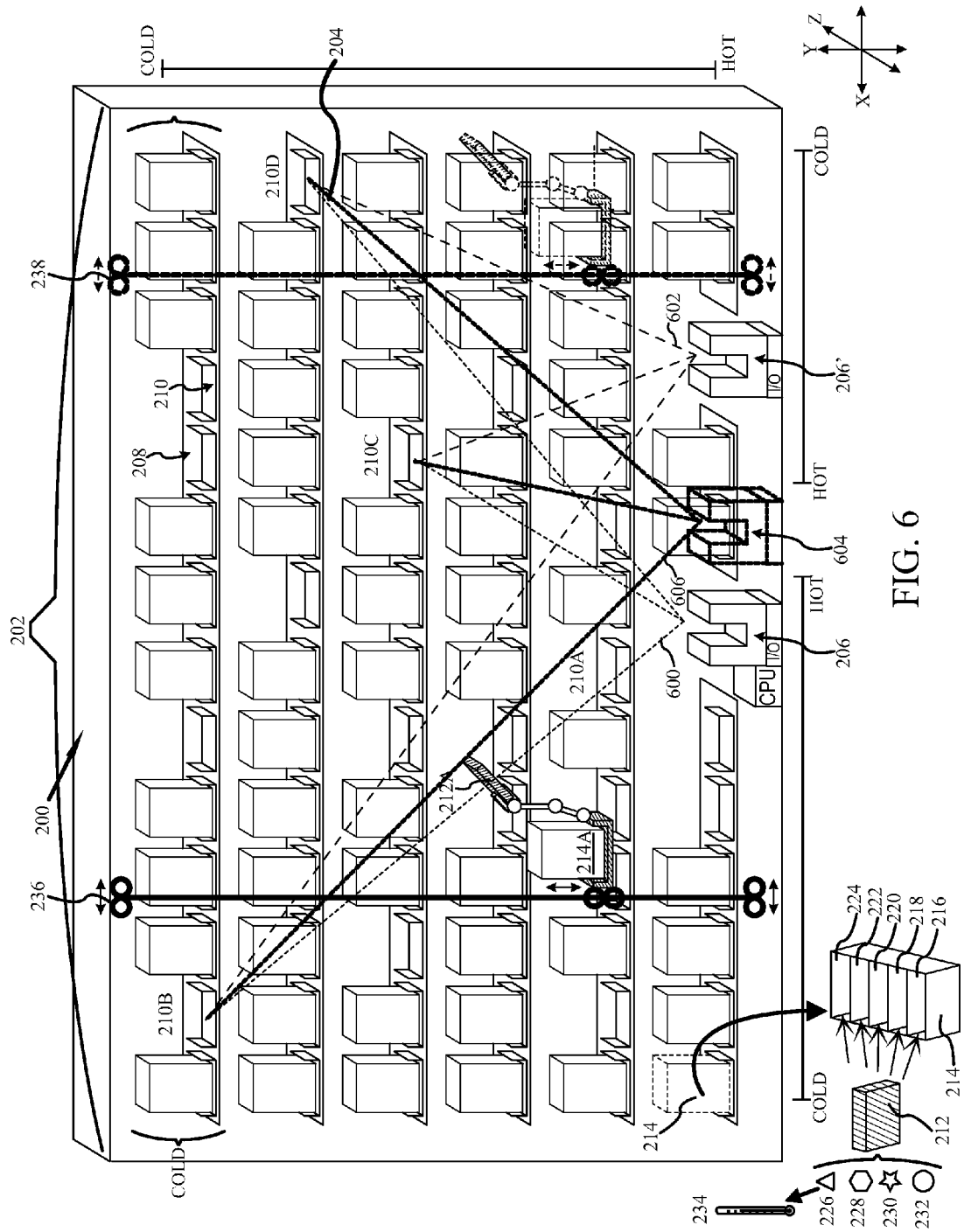
FIG. 6 is another conceptual view of robotic storage system incorporating optimization of data storage elements based on determined heat value in accordance with certain embodiments of the present invention.

As noted above, in varying embodiments RSS 100 may have multiple read/write devices 206. FIG. 6 conceptually illustrates such an embodiment, having read/write device 206 and read write device 206'. As shown there are different physical distances 600 and 602 as between Spots 210B, 210C, 210D and read/write device 206 and read/write device 206'. In at least one embodiment, to simplify the determination of temperature values of each respective spot, the principle of center of mass may be applied to determine a conceptual idealized spot for a phantom read/write device 604. This phantom read/write device 606 is conceptually located at the mean location of distances 606 to all spots between read/write device 206 and read/write device 206'.

In addition, where RSS 100 and more specifically the DSEs 212 are providing storage for one or more virtualized file systems, the above described method and system may be easily adapted. Specifically, the heat values 234 as determined for the DSEs 212 supporting a first virtual file system associated to read/write device 206 are correlated to temperature values of storage locations 202 based on the distances 600, whereas the heat values 234 as determined for the DSEs 212 supporting a second virtual file system associated to read/write device 206' are correlated to temperature values of storage locations based on the distances 602.

Figure 7:
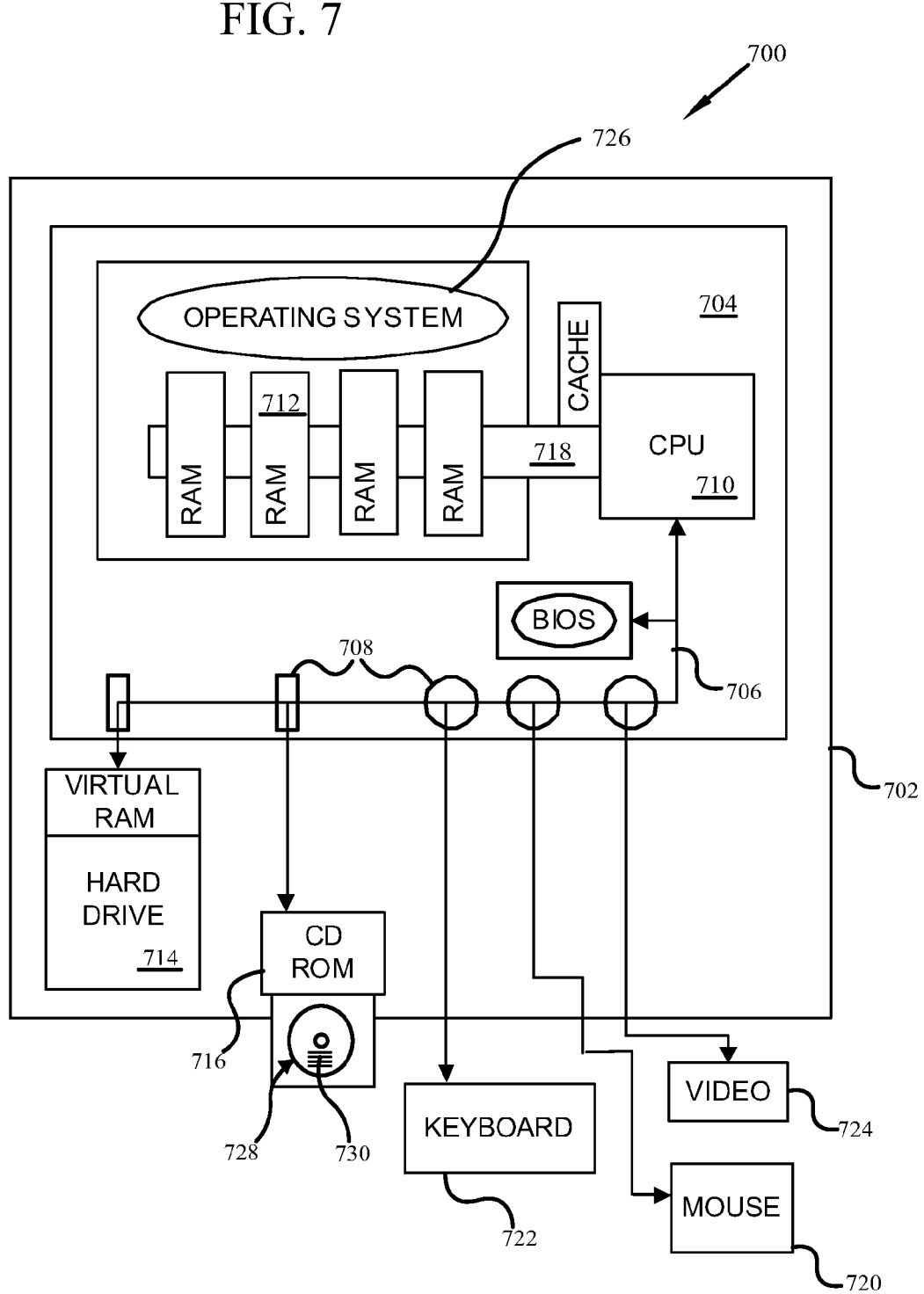
FIG. 7 is a block diagram of a computer system in accordance with certain embodiments of the present invention.

With respect to the above description of RSS 200 and method 300 it is understood and appreciated that the method may be rendered in a variety of different forms of code and instruction as may be used for different computer systems and environments. To expand upon the initial suggestion of a computer assisted implementation as indicated by the CPU in FIG. 2, FIG. 7 is a high level block diagram of an exemplary computer system 700 that may be incorporated into RSS 200. Computer system 700 has a case 702, enclosing a main board 704. The main board 704 has a system bus 706, connection ports 708, a processing unit, such as Central Processing Unit (CPU) 710 with at least one macroprocessor (not shown) and a memory storage device, such as main memory 712, hard drive 714 and CD/DVD ROM drive 716.

Memory bus 718 couples main memory 712 to the CPU 710. A system bus 706 couples the hard disc drive 714, CD/DVD ROM drive 716 and connection ports 708 to the CPU 710. Multiple input devices may be provided, such as, for example, a mouse 720 and keyboard 722. Multiple output devices may also be provided, such as, for example, a video monitor 724 and a printer (not shown).

Computer system 700 may be a commercially available system, such as a desktop workstation unit provided by IBM, Dell Computers, Gateway, Apple, or other computer system provider. Computer system 700 may also be a networked computer system, wherein memory storage components such as hard drive 714, additional CPUs 710 and output devices such as printers are provided by physically separate computer systems commonly connected together in the network. Those skilled in the art will understand and appreciate that the physical composition of components and component interconnections are comprised by the computer system 700, and select a computer system 700 suitable for the establishing RSS 200.

When computer system 700 is activated, preferably an operating system 726 will load into main memory 712 as part of the boot strap startup sequence and ready the computer system 700 for operation. At the simplest level, and in the most general sense, the tasks of an operating system fall into specific categories, such as, process management, device management (including application and user interface management) and memory management, for example.

In such a computer system 700, the CPU is operable to perform one or more of the methods of organizing RSS 200 as described above. The form of the computer-readable medium 728 and language of the program 730 are understood to be appropriate for and functionally cooperate with the computer system 700. In at least one embodiment, the computer system 700 is a SpectraLogic nTier 700, manufactured by Spectra Logic Corp., of Boulder Colo.

It is to be understood that changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A method for organizing a robotic storage system, the method comprising:
   determining a heat value for each portable data storage element within the robotic storage system; and
   organizing temporary storage of each portable data storage element within the robotic storage system based upon the determined heat value for each data storage element.

2. The method of claim 1, wherein each data storage element has a first value associated with a load field, a second value associated with a read/write field, and a third value associated with a user determined field, the heat value determined by evaluating a combination of the first, the second and the third fields.

3. The method of claim 2, wherein each data storage element has a time period since last use, each data storage element having a fourth value associated with a cooling field, the cooling field affected by the time period since the data storage element was last used, the heat value determined by evaluating the combination of the first, the second, the third and the fourth fields.

4. The method of claim 1, further including at least one robot, at least one portable container providing at least two storage positions with different priorities, and plurality of shelves each providing a plurality of spots of varying distance to a data read/write device, the spots structured and arranged to receive the at least one portable container, wherein the robot implements organization of the portable data storage elements according to each determined heat value.

5. The method of claim 1, wherein the heat value is distinct from a priority value of each portable data storage element.

6. The method of claim 1, wherein the organizing is performed essentially contemporaneously with the determination of the heat value.

7. The method of claim 1, wherein determining the heat value is performed at a first time and the organizing is performed at a second time occurring after the first time.

8. A robotic storage system, comprising:
   a plurality of storage locations of varying priority and varying distance to a data read/write device; and
   a plurality of portable data storage elements each having at least a load field, a read/write field and a user determined field,
   a temporary storage location for each portable data storage element determined at least in part by evaluating the load field, the read/write field and the user
   determined field of each of the portable data storage elements.

9. The system of claim 8, further including at least one portable container having at least a first storage position having a first priority and a second storage position having a second priority, the second priority being less than the first priority, the storage positions structured and arranged to temporarily receive at least one portable data storage element, the storage locations structured and arranged to temporarily receive the at least one portable container.

10. The system of claim 9, wherein the storage locations are provided at least in part by a plurality of shelves in varying proximity to the data read/write device, each shelf having a plurality of spots in varying proximity to the data read/write device, each spot structured and arranged to receive the at least one portable container.

11. The system of claim 8, wherein each data storage element has a load request history, the load field for each data storage element is determined at least in part by an average of the load request history and standard deviation of load request history for all of the data storage elements.

12. The system of claim 8, wherein each data storage element has a read/write per load history, the read/write field for each data storage element being determined at least in part by the read/write per load history of each data storage element as compared to the standard deviation of the read/write per load history for all of the data storage elements.

13. The system of claim 8, wherein each data storage element has a fourth field associated with a cooling field, the cooling field affected by a time period since the data storage element was last used, the temporary storage location for each data storage element determined at least in part by evaluating the data storage element's load field, read/write field, user determined field and cooling field.

14. A method for organizing a robotic storage system, comprising:
   determining for each of a plurality of data storage elements a temperature value, each temperature value determined at least in part by evaluating for each data storage element at least a load field, a read/write field and a user determined field; and
   organizing temporary storage of each data storage element within a robotic storage system having a plurality of storage locations of varying priority and varying distance to a data read/write device, each storage location for a given data storage element determined by the temperature value of the given data storage element.

15. The method of claim 14, wherein the temperature value is selected from a pre-defined range of cold to hot, a hot data storage element receiving a first storage storage location having a closer proximity and higher priority then a cold data storage element receiving a second storage location having a remote proximity and a lower priority.

16. The method of claim 14, further including at least one portable container having at least a first storage position having a first priority and a second storage position having a second priority, the second priority being less than the first priority, the storage positions structured and arranged to temporarily receive at least one data storage element, the storage locations structured and arranged to temporarily receive the portable containers.

17. The method of claim 14, wherein the storage locations are provided at lest in part by a plurality of shelves in varying proximity to the data read/write device, each shelf having a plurality of spots in varying proximity to the data read/write device, the proximity of each shelf and the proximity of each spot upon each shelf determining varying priorities for each storage location.

18. The method of claim 14, wherein each data storage element has a load request history, the load field for each data storage element being determined at least in part by the average load history and standard deviation of load history for all data storage elements.

19. The method of claim 14, wherein each data storage element has a read/write per load history, the read/write field for each data storage element being determined at least in part by the read/write per load history of a data storage element as compared to the standard deviation of the read/write per load history for all of the data storage elements.

20. The method of claim 14, wherein each data storage element further has a cooling field, the cooling field affected by a time period since the data storage element was last used, the temperature value determined at least in part by evaluating for each data storage element at least the load field, the read/write field, the user determined field and the cooling field.

21. The method of claim 14, wherein the organizing is performed essentially contemporaneously with the determination of the temperature value.

22. The method of claim 14, wherein determining the temperature value is performed at a first time and the organizing is performed at a second time occurring after the first time.

23. A robotic storage system, comprising:
- a portable data storage element having at least a load history, a read/write history, and a user determined priority;
- a data read/write device, structured and arranged to read the portable data storage element;
- a repository structured and arranged to store the portable data storage element at locations of varying priority, the repository further including:
  - a portable container providing temporary storage to the storage element, the portable container having at least a first temporary storage position having a first priority and a second temporary storage position having a second priority the second priority less than the first priority;
  - a plurality of shelves in varying proximity to the read write device, each shelf structured and arranged with a plurality of spots in varying proximity to the data read/write device structured and arranged to temporarily receive the portable data container, wherein the proximity of the shelf and the proximity of each spot upon the shelf determine varying priorities for temporary storage of the portable container;
- a robot structured and arranged to move the portable container between the data read/write device and a determined location; and
- a director structured and arranged to direct the robotic storage system for temporary storage of the portable storage element based on a heat value determined for the portable data storage element by evaluating the load history, the read/write history and the user determined priority.

24. A robotic storage system, comprising:
- means for determining for each of a plurality of data storage elements a heat value, a temperature level determined at least in part by evaluating for each data storage element at least a load field, a read/write field and a user determined field; and
- means for organizing temporary storage of each portable data storage element within a robotic storage system having a plurality of storage locations of varying priority and varying distance to a data read/write device, the temporary storage location for each data storage element determined by the heat value of the data storage element.

25. The robotic storage system of claim 24, wherein the temperature value is selected from a pre-defined range of cold to hot, a hot data storage element receiving a temporary storage location having a closer proximity and higher priority then a cold data storage element receiving a temporary storage location having a remote proximity and a lower priority.

26. The robotic storage system of claim 24, further including at least one portable container having at least a first storage position having a first priority and a second storage position having a second priority, the second priority being less than the first priority, the storage positions structured and arranged to temporarily receive at least one of the data storage element, the storage locations structured and arranged to temporarily receive the portable containers.

27. The robotic storage system of claim 24, wherein the storage locations are provided at lest in part by a plurality of shelves in varying proximity to the data read/write device, each shelf having a plurality of spots in varying proximity to the data read/write device, the proximity of each of the shelves and the proximity of each spot upon each of the shelves determining varying priorities for each storage location.

\* \* \* \* \*